(12) United States Patent
Martens et al.

(10) Patent No.: US 7,171,565 B1
(45) Date of Patent: Jan. 30, 2007

(54) METHOD AND SYSTEM FOR PRODUCING WISE CARDS

(75) Inventors: Marco Martens, Chappaqua, NY (US); Charles Philippe Tresser, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 09/685,026

(22) Filed: Oct. 10, 2000

(51) Int. Cl.
*H04L 9/00* (2006.01)
*H04L 9/32* (2006.01)

(52) U.S. Cl. .............................. 713/185; 726/9; 725/6; 902/26

(58) Field of Classification Search ................. 713/185
See application file for complete search history.

(56) References Cited

U.S. PATENT DOCUMENTS 5,261,002 A * 11/1993 Perlman et al. ............... 380/30
5,396,558 A * 3/1995 Ishiguro et al. ............... 705/67
5,933,501 A * 8/1999 Leppek ........................ 380/259
6,289,324 B1 * 9/2001 Kawan ......................... 705/41
6,466,671 B1 * 10/2002 Maillard et al. ............. 380/227
6,799,272 B1 * 9/2004 Urata ........................... 713/171

OTHER PUBLICATIONS

Schneier, "Applied Cryptography: Protocols, Algorithms, and Source Code in C," 1996, Second Edition, pp. 466-474.*
David Corcoran, Muscle Flexes Smart Cards into Linux, Source Linux Journal archive, Aug. 1998, Article No. 8.*

* cited by examiner

Primary Examiner—Nasser Moazzami
Assistant Examiner—Brandon Hoffman
(74) Attorney, Agent, or Firm—Stephen C. Kaufman, Esq.; McGinn IP Law Group, PLLC

(57) ABSTRACT

A method (and system) for preventing counterfeiting and cloning of smart cards, includes providing a smart card with a cryptographic structure for authorizing the smart card which can not be accessed completely by a predetermined small number of readings. The cryptographic structure can be built only by whoever emits the card or an agent thereof.

25 Claims, 3 Drawing Sheets

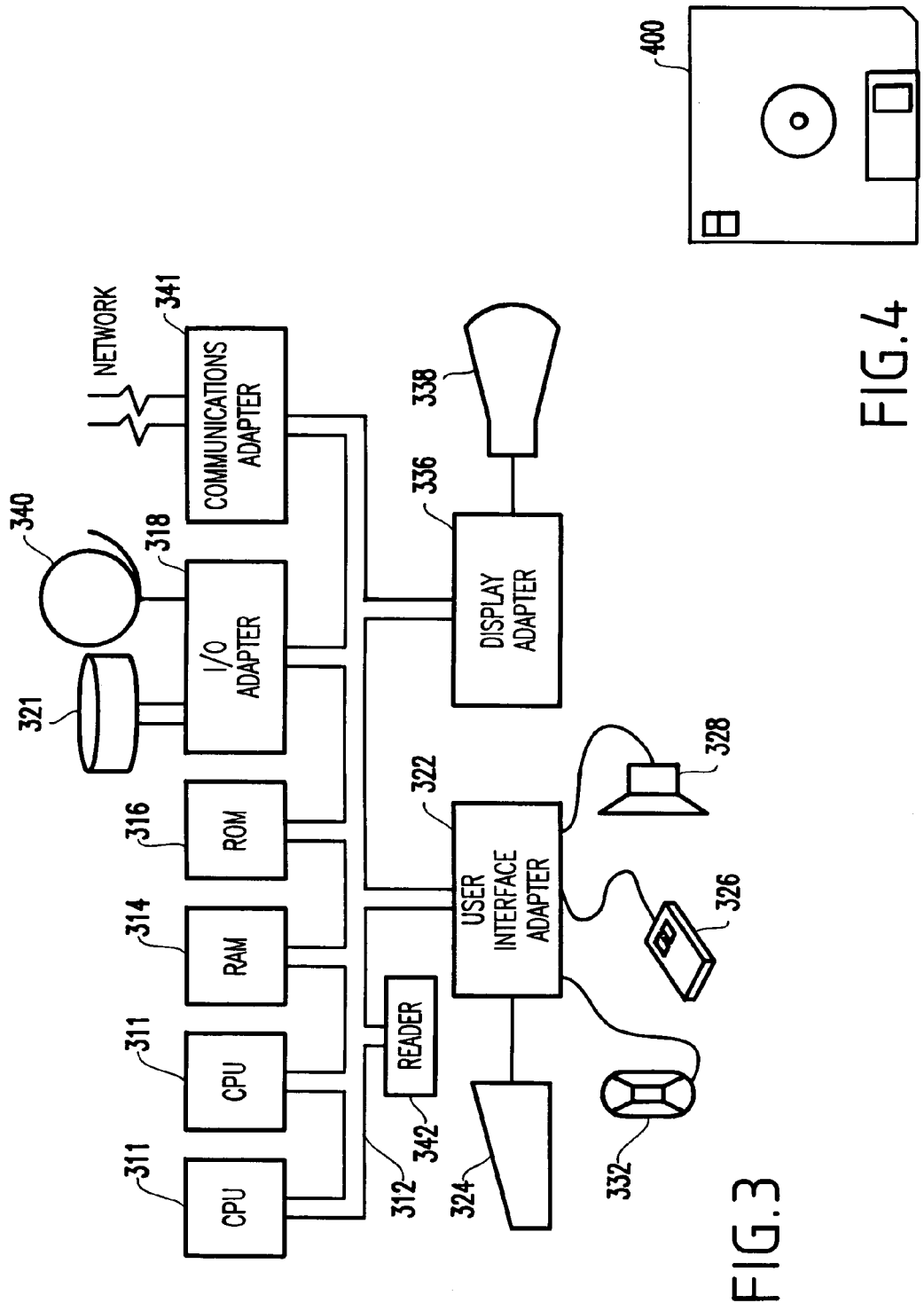

METHOD AND SYSTEM FOR PRODUCING WISE CARDS

BACKGROUND OF THE INVENTION

1. Field of the Invention

The present invention generally relates to producing hard-to-imitate "smart cards" (e.g., so-called "wise cards"), and to producing smart cards whose clones would be of limited value, as would be tampering with the card.

2. Description of the Related Art

Smart cards have been proposed as a technology offering the possibility of secure off-line transactions. However, recently, several successful attacks on conventional smart cards have been reported (e.g., see R. Anderson, M. Kuhn; "Tamper Resistance—A Cautionary Note." The Second USENIX Workshop on Electronic Commerce. November 1996, R. Anderson, M. Kuhn; "Low Cost Attacks on Tamper Resistant Devices." Preprint. 1997, and P. Kocher, J. Jaffe and B. Jun; "Introduction to Differential Power Analysis and Related Attacks" Manuscript, Cryptography Research, Inc. 1998.).

One such reported attack allows cracking of the digital code which is supposed to warranty the security of the card, by inferring conclusions of the code from observations of electrical currents, power consumption, and other electro-magnetic manifestations in the card during use. Other low-cost attacks are similarly known on current smart card technology.

This has generated much publicity and some skepticism on the part of users. For example, the attack mounted by Paul Kocher of Cryptography Research was made very well-known to the public by the publication of a paper by Peter Wayner on this attack on pages D1–D2 of the New York Times of Monday, Jun. 22, 1998.

Given the benefits that banks, credit cards companies, and other users were expecting from a wide acceptance of the security offered by smart cards, it is important to be able to overcome the lack of security (both real and perceived) offered by present smart card technology.

Indeed, several improvements of the original design have been proposed (and this process may continue in the future). However, since the above-described, successfully mounted attack only needs some of the electrical analysis and possibly the physical attacks one could perform on smart cards, the desired level of confidence is not likely to be restored so long as solutions only advance the original (and conventional) idea of enclosing all of the security in the card.

It is noted that by using, for example, some zero-knowledge protocol, a smart card can be authenticated but, reputedly, cannot be duplicated. A general reference to smart card technology and applications can be found in "Smart Cards: A Guide to Building and Managing Smart Card Applications," by Henry Dreifus and J. Thomas Monk, John Wiley & Sons, 1998. It is noted, that, in the rest of the present disclosure, any electronic component using such technology and which has some memories and/or some processing capabilities, will be called "a smart component" or "a chip" or "a smart card", even if it does not actually take any form resembling a card.

One of the main virtues attributed to smart cards is that some transactions based on smart cards, such as payments and authentication, can be performed using the smart card, without connection to a database. Of course, this freedom from a link to a database only has value as long as the secrets in the card resist attacks. One can try to modify the smart card technology so as to reach a level of security considered sufficient. Such an approach is taken for example in U.S. patent application Ser. No. 09/397,503 entitled "METHOD AND APPARATUS FOR PRODUCING DUPLICATION- AND IMITATION-RESISTANT IDENTIFYING MARKS ON OBJECTS, AND DUPLICATION- AND IMITATION-RESISTANT OBJECTS" by N. Amer et al, assigned to the present assignee and incorporated herein by reference. That approach requires a smart card reader with quite different characteristics than those of present smart card readers.

Another approach, used in the present invention, sacrifices part of the full off-line usability of smart cards to insure accrued security.

Thus, improvements in the security of smart cards are surely useful, but some radically new approaches must be used. One approach may include ensuring the physical security of the card, but this might not be enough to prevent producing huge amounts of false smart cards once one of them has been successfully attacked.

Hence, in conventional cards, counterfeiting/duplication is not rendered difficult since confidential information is carried on the card and an unscrupulous person may find the information simply by looking at/reading the energy construction inside of the card. That is, with a plurality of readings of the card, the information held within the card can be easily detected.

However, no conventional method (and system) has addressed such problems.

SUMMARY OF THE INVENTION

In view of the foregoing and other problems of the conventional methods and systems, an object of the present invention is to provide a method (and system) in which counterfeiting and cloning of smart cards is made more difficult and/or less profitable.

In a first aspect of the present invention, a method (and system) is provided which is based on cryptography with the cryptographic structure/key not being carried on the smart card.

More specifically, the smart-card-type of security, often all carried on the card itself, is complemented in the present invention by extra protection depending on cryptography, with the cryptographic structure (e.g., a key) not being carried by the card and which cannot be accessed completely by a predetermined small number of readings, and in fact the cryptographic structure can only be built by whoever emits the card or the agent thereof.

This principle prevents the creating of false cards different from the legitimate ones, but does not prevent the fabrication of as many clones one wishes of a given legitimate smart card. Thus, the invention also provides a mechanism of protection designed to prevent and/or discourage both copying and creation of new cards.

Thus, the present invention provides a new implementation of smart cards and provides the readers which can be used in combination with such smart cards. These cards necessitate more connections to a data base than typical, conventional smart cards, but far less than credit cards.

Such smart cards are particularly well-adapted to use in electronic business (e.g., "e-business") since online transactions are taking place anyhow. Further, such smart cards are designed so that an evil merchant cannot acquire the information needed to fabricate clones of the card from a reading (nor from a few readings) of the smart card. Moreover, a counterfeiter can only get limited benefit from tampering with the card, and cannot imitate a legitimate card to create different ones, while cloning has limited value as online controls are performed on occasion.

The card (or other carrier of the overall system, but herein the word card will be used for definiteness) will carry some chosen type of chip. In that chip, there will be determined N channels (e.g., C1, C2, . . . , CN, where N is for example on the order of 100 (but will be easier to augment as technology progresses)).

Each channel Ci, with i in 1,2, . . . , N, carriers a pair of numbers (hi, li) (e.g., for definiteness, hi is the $i^{th}$ high number and li is the $i^{th}$ low number). Both low and high numbers are about 1024 bits long (and more as technology progresses, as would be evident to one or ordinary skill in the art; that is, more bits provide greater security). More specifically, this number of bits corresponds to secure use of the Rivest-Shamir-Adleman (RSA) protocol at the time of writing. Other methods also can be used such as elliptic curve-sallow for secure use of smaller numbers of bits (e.g., see "Handbook of Applied Cryptography", by Alfred J. Menezes, Paul C. van Oorschot and Scott A. Vanstone, CRC Press, 1997).

Public key cryptography with associated distinct encoding and decoding functions Vi and $Vi^{-1}$ are used in each channel i. As is well known (e.g., see "Handbook of Applied Cryptography", by Alfred J. Menezes, Paul C. van Oorschot and Scott A. Vanstone, CRC Press, 1997), each function $Vi^{-1}$ is known publicly, but Vi is known only to some party called the owner and is secret in the sense that it is considered computationally infeasible to determine it from $Vi^{-1}$.

For each i in 1, 2, . . . , N, the pair (hi, li) is such that hi=Vi(li), or hi=Vi(K(li)) where K represents some publicly-known cryptographic hash function, as described, for example, in the aforementioned book by Menezes et al. Each li contains several symbols for redundancy, which may for example carry a specific mark of whoever emits the cards. Furthermore, an invertible function f is chosen and made public, and the low numbers in card satisfy $l(i+j)=f^j(li)$, where $f^j$ stands for the $j^{th}$ iterate of the function f.

The reader is preferably equipped with a random number generator, which, when a card is read, chooses a pair (a, b) of distinct numbers with a<b between 1 and N. Before processing the chip as usual, the reader obtains the pair (ha, la) as well as hb (e.g., since a and b are known by the reader as well as the function f, the reader can compute lb from a,b, and la by computing $lb=f^{(b-a)}(la)$). Using the public keys $Va^{-1}$ and $Vb^{-1}$, the reader can check whether the pairs (ha, la) and (hb, lb) are compatible, and, consequently, that the numbers ha, 1a, and hb belong to the same legitimate card.

Since the reader only obtains the content of two channels, an evil merchant cannot build a believably true counterfeited card by combining this information with the secrets which might have been obtained about the chip using a smart card attack as described previously.

The entire process can be performed off-line as it is based on public key cryptography. The only danger is the card which has been cloned or re-provisioned with money fraudulently by someone having discovered the intrinsic secret of the chip.

To combat this danger, periodically (e.g., daily, weekly, randomly, etc. depending upon the designer's constraints and requirements), the smart card reader preferably communicates with a data base where the amount extracted from a given card is checked. If a card is detected as delivering too much money (e.g., more than would be reasonably authorized), the data base communicates the corresponding 11 to all readers in the network, which may be worldwide, so that the cards carrying that number will be declined in the future.

Thus, far less dependence on the network is required according to the preent invention, than what is necessary to process credit cards. That is, credit cards processing requires an on-line processing in which the customer presents the card to the merchant and the merchant passes the card through a reader and connects to the bank or other issuing authority for authorization to complete the transaction.

Thus, credit card processing is significantly more burdensome than the processing of the present invention. In some applications, one may change the cryptographic structure/keys every so often and invalidate cards after some time of usage so that limited data bases must be kept in all readers of the network.

Clearly, the marginal cost per transaction is much lower for banks using the present invention than for credit cards. Further, while the price is higher than for original format smart cards (e.g., for purposes of the present application, "original format smart cards" are defined as conventional smart cards having the confidential information/secrets on the card), the level of security is much higher, and the huge danger of having all the secrets in the card has been avoided. This new format of card is particularly well adapted for e-commerce, since the liability of having to be on line is cost-free as all operations are performed on-line anyhow.

In the context of electronic commerce, the advantage of the present invention over credit cards is the higher level of both security for both parties of the transaction and the privacy of the customer. Finally, as alluded to above, the transactions are performed essentially and substantially off-line.

BRIEF DESCRIPTION OF THE DRAWINGS

The foregoing and other objects, aspects and advantages will be better understood from the following detailed description of a preferred embodiment of the invention with reference to the drawings, in which:

FIG. 3 illustrates an exemplary information handling/computer system for use with the present invention; and FIG. 4 illustrates a storage medium 400 for storing steps of the program for the process of verifying according to the present invention.

DETAILED DESCRIPTION OF A PREFERRED EMBODIMENT OF THE INVENTION

Figure 1:
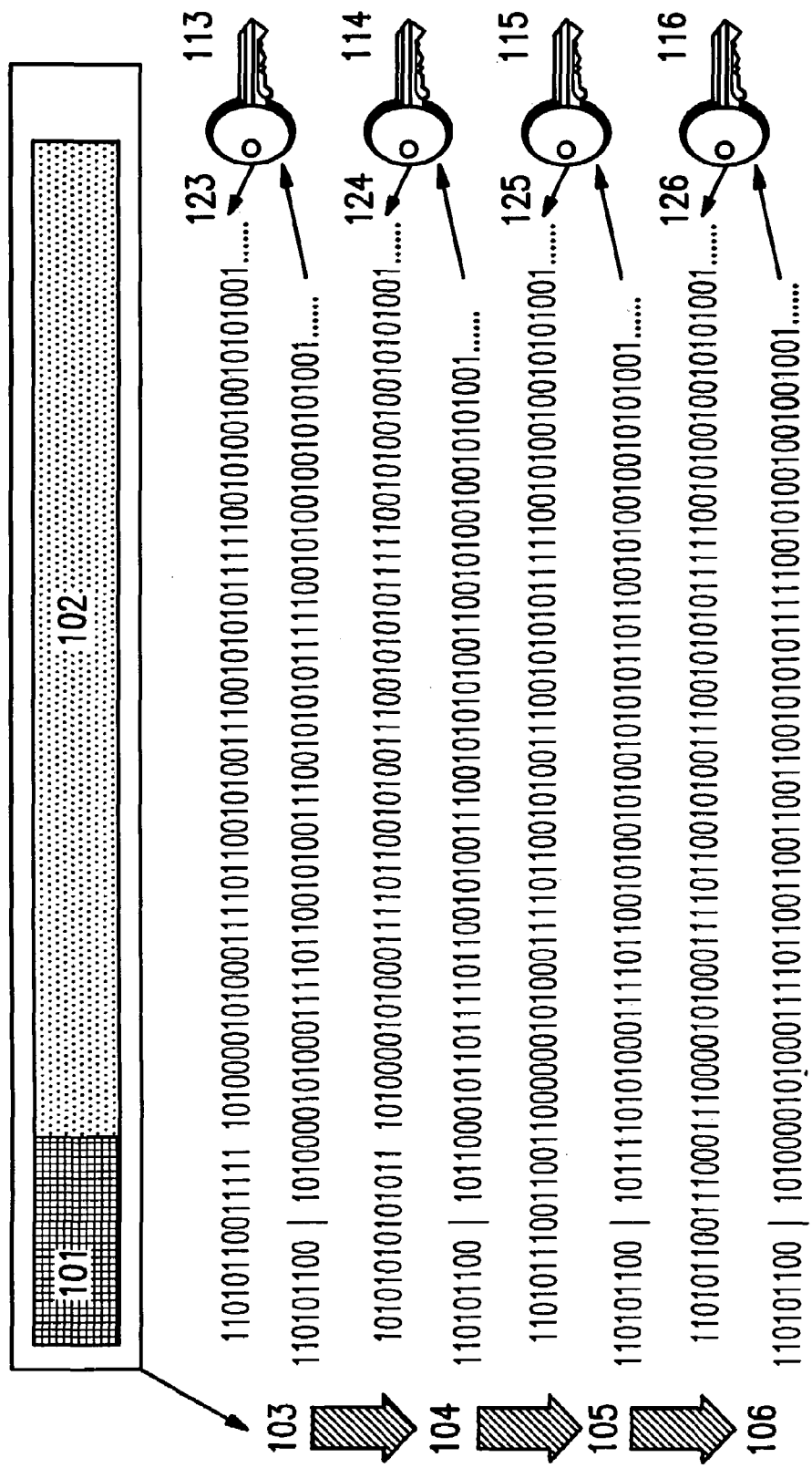
FIG. 1 is a flow diagram describing how to generate the pairs (hi, li) according to the present invention.

Referring now to the drawings, and more particularly to FIGS. 1–4, a preferred embodiment of the present invention will be described below.

FIG. 1 illustrates a flow diagram of a process of building the pairs (hi,li) to be written in the chip. A prefix 101 of 11 can be chosen once and for all, or changed whenever needed. This prefix must be publicly known, and serves to prevent forming apparently legitimate pairs by use of the public part of the encryption method.

The prefix 101 is followed by a relatively long sequence 102, which may be generated by any method chosen by the card emitter, so that the same number is not chosen twice, and also so that the corresponding other li's are not chosen as new lls. Preferably, the sequence 102 is preferably 1024 bits or more. With the more bits provided, the more security is provided. If the card is accessed and read frequently (e.g., several times per minute, etc.), more bits would be preferred, whereas if the card was designed to be accessed only infrequently, then less bits would be required for desired security.

The concatenation on 101 and 102 forms 11 at 103. Then, a function f which is invertible and will be publicly known is chosen, and one constructs 12=f(11) at 104, 13=f(12) at 105, 14=f(13) at 106 and so forth. The function f, for example, can be chosen to be the identity map, in which case 11=12=13= . . . etc.

For some number N, typically of the order of 100 or more, N public key-private key pairs are chosen. It is noted that, the more pairs there are, the greater the security. As mentioned above, if the card is used frequently, then more key pairs would be desired. The first private key V1 at 113 is used to compute b1=V1(11) at 123, the second private key V2 at 114 is used to compute h2=V2(12) at 124, the third private key V3 at 115 is used to compute h3=V3(13) at 125, the fourth private key V4 at 116 is used to compute h4=V4 (14) at 126, and so on.

Figure 2:
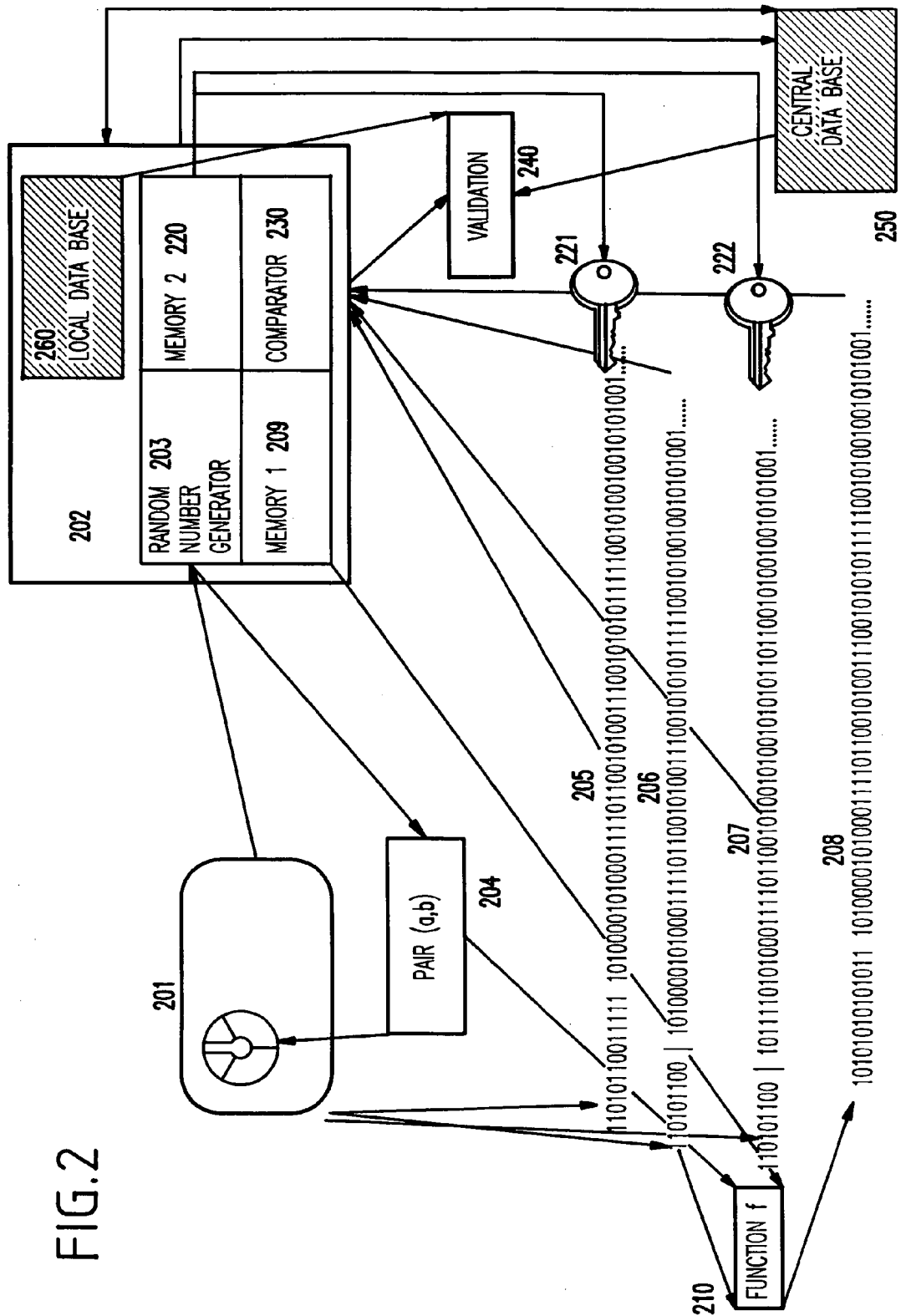
FIG. 2 is a flow diagram showing the process of verifying that a card is authentic, or at worst an exact clone of an authentic card, and checking if the card is not in the list of cards to be refused.

Referring now to FIG. 2, a flow diagram is shown of the process of verifying that a card is authentic (or at worst an exact clone of an authentic card before the intrinsic mechanism of the chip is used), and checking if the card is not in the list of cards to be refused.

When the card 201 is read by the reader 202, a random generator 203 is prompted which gives at 204 two integer numbers a and b which are between 1 and N, with a<b.

These numbers a, b are transmitted to the chip at 210 which delivers two high numbers at 205 and 207, and the low number at 206 in the channel a.

Then, the pairs (a, b), together with the function f at 210 in memory 1, at 209 in the reader, are used to compute the low number $lb=f^{(b-a)}(la)$ at 208. Memory 2 at 220 in the reader 202 delivers the public keys $Va^{-1}$ at 221 and $Vb^{-1}$ at 222.

These public keys are used at comparator 230, together with the pairs (ha, la) and (hb, lb), to verify that the pairs are compatible with the corresponding keys, and that the pairs are from the same legitimate card. At this point, it is known by the operation at the comparator 230 whether the card is legitimate, whether the card is a clone, and/or whether the card is up to an overdraft limit, for example, by a counterfeiter able to manipulate the chip. To limit this danger, a final validation is made by a validation step/device 240 after performing any or all of:

1) contacting the central data base 250 if the entire transaction is made on-line with no penalty (e.g., in e-business transactions, for public telephone systems, etc.); and/or 2) checking with the local data base 260 in the reader 202 which is refreshed periodically, depending on the application, by contact between local database 260 and central database 250 which may occur at other times than the transaction.

While the overall methodology of the invention is described above, the invention can be embodied in any number of different types of systems and executed in any number of different ways, as would be known by one ordinarily skilled in the art.

For example, as illustrated in FIG. 3, a typical hardware configuration of an information handling/computer system for use with the invention is shown. In accordance with the invention, preferably the system has at least one processor or central processing unit (CPU) 311 and more preferably several CPUs 311. The CPUs 311 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, an input device such as a mouse, trackball, joystick, touch screen, etc. 326, speaker 328, microphone 332, and/or other user interface device to the bus 312), communication adapter 341 (for connecting the information handling system to a data processing network such as an intranet, the Internet (World-Wide-Web) etc.), and display adapter 336 (for connecting the bus 312 to a display device 338). The display device could be a cathode ray tube (CRT), liquid crystal display (LCD), etc., as well as a hard-copy printer (e.g., such as digital printer). Further, a reader 342 is coupled to the CPU 311 via bus 312.

In addition to the hardware/software environment described above, a different aspect of the invention includes a computer-implemented method for verifying a smart card and preventing/discouraging counterfeiting and tampering thereof. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, as shown in FIG. 4, in addition to the hardware and process environment described above, a different aspect of the invention includes a computer-implemented method for verifying that a smart card is authentic (or at least a clone of a legitimate card), and checking whether the card is in the list of cards to be refused for processing, as described above. As an example, this method may be implemented in the particular hardware environment discussed Such a method may be implemented, for example, by operating the CPU 311 (FIG. 3), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 311 and hardware above, to perform the above method.

This signal-bearing media may include, for example, a RAM (not shown in FIG. 4) contained with the CPU 311 or auxiliary thereto as in RAM 314, as represented by a fast-access storage for example. Alternatively, the instructions may be contained in another signal-bearing media, such as a magnetic data storage diskette 400 (e.g., as shown in FIG. 4), directly or indirectly accessible by the CPU 311.

Whether contained in the diskette 400, the computer/CPU 311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a method (and system) are provided in which counterfeiting and cloning of smart cards is made more difficult and/or less profitable. The method is based on cryptography with the cryptographic structure/key not carried on the smart card. Instead, the present invention provides extra protection depending on cryptography, with the key not carried by the card, and is kept secret by whoever emits the card of the agent thereof. Thus, the creating of false cards different from the legitimate ones, is prevented.

Further, to prevent the fabrication of as many clones one wishes of a given legitimate smart card, the invention provides a mechanism of protection designed to prevent and/or discourage both copying and creation of new cards.

Thus, the present invention provides a new implementation of smart cards and provides smart cards readers which can be used in combination with such smart cards. In each reading, the reader simply reads, in a very random way, a very small portion of the secure information on the card. Hence, many readings of the card would be required in order to detect the energy thereon, and it is anticipated that after such a large plurality of readings the value of the card (e.g., the money value held thereon, etc.) would be exhausted. These cards necessitate more connections to a data base than typical, conventional smart cards, but far less than credit cards.

Further, the smart cards do not carry confidential information thereon and the smart cards are difficult to duplicate/counterfeit. Indeed, there is no key at all held in the card. The card merely holds two related words (e.g., a pair including the suffix and the sequence) as a secret. Instead, the reader holds the key (e.g., the public key) therein along with a database which, as mentioned above, is updated periodically. The database holds information representing disallowed/refused cards possibly representing that the cards have been stolen, voluntarily discontinued by the legitimate owner, etc.

Another key advantage of the invention is that the reading/transaction process is performed substantially off-line. The reader is on-line merely when it is linked to a network or the like for updating the contents of the database with the list of unauthorized cards, etc.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of preventing counterfeiting of a smart card, comprising:
    providing a smart card with a cryptographic structure for authorizing the smart card which cannot be accessed completely by a predetermined small number of readings,
    wherein said cryptographic structure can be built only by whoever emits the card or an agent thereof;
    providing a reader for reading said smart card and including a database holding information related to unauthorized smart cards, said reader being on-line, such that said reader is operatively connected to a network, only when said database of said reader is being updated by said network,
    wherein said reader includes a random number generator, which, when a card is read, chooses a pair (a, b) of distinct numbers with a<b between 1 and N,
    wherein said smart card carries thereon predetermined N channels as C1, C2, . . . , CN, where N is an integer,
    wherein each channel Ci, with i equal to 1, 2, . . . , N, carries a pair of numbers (hi, li), and
    wherein hi is the $i^{th}$ high number and li is the $i^{th}$ low number,
    wherein said reader obtains a content of only two of said channels, and periodically communicating, by said reader of said smart card, with a database where a predetermined characteristic of the card is checked.

2. The method of claim 1, wherein an entire process of said method is performable off-line.

3. The method of claim 1, further comprising:
    using public key cryptography with associated encoding and decoding functions Vi and $Vi^{-1}$ in each channel i,
    wherein each function $Vi^{-1}$ is known publicly, and Vi is known only to a predetermined party representing an owner of the smart card.

4. The method of claim 3, wherein for each i in 1, 2, . . . , N the pair (hi, li) is such that hi=Vi(li), or hi=Vi(K(li)), where K represents a publicly-known cryptographic hash function, and
    wherein each li contains a plurality of symbols for redundancy.

5. The method of claim 4, further comprising:
    processing, using an invertible function f which is made public, such that the low numbers in said smart card satisfy $l(i+j)=f^j(li)$, where $f^j$ represents the $j^{th}$ iteration of the function f.

6. The method of claim 4, wherein before processing the smart card, the reader obtains the pair (ha, la) and hb;
    using the public keys $Va^{-1}$ and $Vb^{-1}$, checking by the reader whether the pairs (ha, la) and (hb, lb) are compatible, and, consequently, that the numbers ha, la, and hb belong to a same legitimate card.

7. The method of claim 6, wherein said pairs (hi, li) to be contained on the smart card are generated by:
    choosing a prefix of l1 once for all transactions, or changed whenever needed, wherein said prefix is publicly known; and
    providing a sequence, such that the sequence is generated so that a same number is not chosen twice, and so that corresponding other li's are not chosen as new l1s.

8. The method of claim 7, further comprising:
    concatenating the prefix and the sequence to form l1; and
    choosing a function f which is invertible and is publicly known, to construct l2=f(l1), l3=f(l2), and so forth.

9. The method of claim 8, wherein the function f is chosen to be the identity map, in which case l1=l2=l3=. . . =lN.

10. The method of claim 9, choosing, for a number N, N public key-private key pairs, such that a first private key V1 is for computing h1=V1(l1), a second private key V2 is for computing h2=V2(l2), and so on.

11. The method of claim 10, further comprising:
    verifying whether the smart card is authentic; and
    checking whether the smart card is not in a list of cards to be refused.

12. The method of claim 7, wherein said sequence comprises equal to or less than 1024 bits.

13. The method of claim 1, wherein the predetermined characteristic comprises whether a smart card has delivered more than a predetermined amount of money to a user of the smart card.

14. The method of claim 13, wherein if a card is detected as delivering too much money, the data base communicates a corresponding number l1 to all readers in a network, so that smart cards carrying said corresponding number are declined.

15. The method of claim 1, wherein said cryptographic structure is changed periodically.

16. The method of claim 1, wherein said smart card is invalidated after a predetermined time of usage.

17. The method of claim 1, wherein, when the smart card is read by said reader, a random generator is prompted which provides two integer numbers, a and b, which are not between 1 and N, with a<b.

18. The method of claim 17, wherein said numbers a, b are transmitted to the smart card which delivers two high numbers ha, hb, and a low number la in a channel a, and wherein the pair (a, b), together with a function f in a memory in the reader, are used to compute the low number $lb=f^{(b-a)}(la)$, said memory in said reader delivering public keys $Va^{-1}$ and $Vb^{-1}$.

19. The method of claim 18, wherein the public keys are used by a comparator together with the pairs (ha, la) and (hb, la), to verify that the pairs are compatible with the corresponding keys, and that the pairs are from a same legitimate card.

20. The method of claim 1, further comprising:

performing a final validation of the smart card by at least one of:

contacting a central data base if an entire transaction is made on-line with no penalty; and checking with a local data base in said reader, said local database being refreshed periodically by contact between said local database and said central database.

21. The method of claim 1, wherein information stored on said smart card is devoid of confidential information.

22. A method of preventing counterfeiting of a smart card, comprising:

providing a smart card such that none of confidential information and a cryptographic key for authorizing the smart card, is carried on the smart card;

reading said card by a reader such that in each reading, said reader reads only a predetermined small amount of information which makes the card unique, wherein said reader includes a random number generator, which, when a card is read, chooses a pair (a, b) of distinct numbers with a<b between 1 and N, wherein before processing the smart card, the reader obtains the pair (ha, la) and hb;

using the public keys $Va^{-1}$ and $Vb^{-1}$, checking by the reader whether the pairs (ha, la) and (hb, la) are compatible, and, consequently, that the numbers ha, la, and hb belong to a same legitimate card, wherein said pairs (hi, li) to be contained on the smart card are generated by:

choosing a prefix of ll once for all transactions, or changed whenever needed, wherein said prefix is publicly known;

providing a sequence, such that the sequence is generated so that a same number is not chosen twice, and so that corresponding other li's are not chosen as new lls;

concatenating the prefix and the sequence to form ll;

choosing a function f which is invertible and is publicly known, to construct 12-l(11), 13-l(12), and so forth, wherein the function f is chosen to be the identity map, in which case 11-12-13= . . . =lN; and choosing for a number N, N public key-private key pairs, such that a first private key V1 is for computing h1-Vl(11), a second private key V2 is for computing h2=V2(12), and so on.

23. The method of claim 22, wherein a transaction performed under said method comprises substantially an off-line transaction.

24. A system for preventing cloning of a smart card, comprising:

a smart card such that a cryptographic structure for authorizing the smart card is not carried on the smart card; and a reader for reading the smart card and including a database for linking to a network and being updated periodically with a list of unauthorized smart cards, wherein said reader includes a random number generator, which, when a card is read, chooses a pair (a, b) of distinct numbers with a<b between 1 and N, wherein before processing the smart card, the reader obtains the pair (ha, la) and hb;

using the public keys $Va^{-1}$ and $Vb^{-1}$, checking by the reader whether the pairs (ha, la) and (hb, lb) are compatible, and, consequently, that the numbers ha, la, and hb belong to a same legitimate card, and wherein said cryptographic structure is kept secret by whoever emits the card or an agent thereof, wherein said pairs (hi, li) to be contained on the smart card are generated by;

choosing a prefix of ll once for all transactions, or changed whenever needed, wherein said prefix is publicly known;

providing a sequence, such that the sequence is generated so that a same number is not chosen twice, and so that corresponding other li's are not chosen as new lls;

concatenating the prefix and the sequence to form ll;

choosing a function f which is invertible and is publicly known, to construct 12=f(11), 13=f(12), and so forth, wherein the function f is chosen to be the identity map, in which case 11=12=13= . . . =lN; and choosing, for a number N, N public key-private key pairs, such that a first private key V1 is for computing h1=V1(11), a second private key V2 is for computing h2=V2(12), and so on.

25. A computer-readable medium tangibly embodying a program of recordable, machine-readable instructions executable by a digital processing apparatus to perform a method for preventing counterfeiting and cloning of smart cards, comprising:

providing a smart card with a cryptographic structure for authorizing the smart card which cannot be accessed completely by a predetermined number of readings, reading said card by a reader such that in each reading, said reader reads only a predetermined small amount of information which makes the card unique, wherein said reader includes a random number generator, which, when a card is read, chooses a pair (a, b) of distinct numbers with a<b between 1 and N, wherein before processing the smart card, the reader obtains the pair (ha, la) and hb;

using the public keys $Va^{-1}$ and $Vb^{-1}$, checking by the reader whether the pairs (ha, la) and (hb, lb) are compatible, and, consequently, that the numbers ha, la, and hb belong to a same legitimate card, and wherein said cryptographic structure can be built only by whoever emits the card of an agent thereof, wherein said pairs (hi, li) to be contained on the smart card are generated by:

choosing a prefix of ll once for all transactions, or changed whenever needed, wherein said prefix is publicly known;

providing a sequence, such that the sequence is generated so that a same number is not chosen twice, and so that corresponding other $l_i$'s are not chosen as new $l_1$s;

concatenating the prefix and the sequence to form $l_1$;

choosing a function f which is invertible and is publicly known, to construct $l_2=f(l_1)$, $l_3=f(l_2)$, and so forth, wherein the function f is chosen to be the identity map, in which case $l_1=l_2=l_3=\ldots=l_N$; and choosing, for a number N, N public key-private key pairs, such that a first private key V1 is for computing $h_1=V_1(l_1)$, a second private key V2 is for computing $h_2=V_2(l_2)$, and so on.

* * * * *